US009578109B2

(12) United States Patent
Biswas

(10) Patent No.: US 9,578,109 B2
(45) Date of Patent: Feb. 21, 2017

(54) LONG-LIVED MPTCP SESSIONS

(71) Applicant: Apple Inc., Cupertino, CA (US)

(72) Inventor: Anumita Biswas, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 420 days.

(21) Appl. No.: 14/291,075

(22) Filed: May 30, 2014

(65) Prior Publication Data

US 2015/0350337 A1 Dec. 3, 2015

(51) Int. Cl.

| | |
|---|---|
| ***G06F 15/16*** | (2006.01) |
| ***H04L 29/08*** | (2006.01) |
| ***H04L 12/707*** | (2013.01) |
| ***H04W 80/06*** | (2009.01) |
| ***H04L 29/06*** | (2006.01) |

(52) U.S. Cl.

CPC ............. *H04L 67/142* (2013.01); *H04L 45/24* (2013.01); *H04L 67/141* (2013.01); *H04L 67/143* (2013.01); *H04L 69/163* (2013.01); *H04W 80/06* (2013.01)

(58) Field of Classification Search

CPC ...... H04L 67/142; H04L 45/24; H04L 67/141; H04L 67/143; H04L 69/163; H04W 80/06

See application file for complete search history.

(56) References Cited

U.S. PATENT DOCUMENTS

| | | | | |
|---|---|---|---|---|
| 8,806,030 | B2 * | 8/2014 | Zhu | H04L 67/141 709/228 |
| 9,455,897 | B2 * | 9/2016 | Krishnaswamy | H04L 29/12952 |
| 2006/0148460 | A1 | 7/2006 | Mukherjee et al. | |
| 2007/0240209 | A1 | 10/2007 | Lewis et al. | |
| 2011/0296006 | A1 | 12/2011 | Krishnaswamy et al. | |
| 2012/0099601 | A1 | 4/2012 | Haddad et al. | |
| 2012/0144062 | A1 * | 6/2012 | Livet | H04L 45/24 709/239 |
| 2012/0258674 | A1 * | 10/2012 | Livet | H04B 1/38 455/73 |
| 2013/0318239 | A1 * | 11/2013 | Scharf | H04L 69/16 709/224 |
| 2014/0351447 | A1 * | 11/2014 | Annamalaisami | H04L 65/1069 709/227 |
| 2015/0319270 | A1 * | 11/2015 | Roeland | H04L 61/2007 370/254 |

* cited by examiner

*Primary Examiner* — Moustafa M Meky

(74) *Attorney, Agent, or Firm* — Meyertons Hood Kivlin Kowert & Goetzel, P.C.; Jeffrey C. Hood

(57) ABSTRACT

Techniques for supporting long-lived multipath transmission control protocol (MPTCP) sessions. An MPTCP session may be established between two endpoints. Application data may be communicated between the MPTCP endpoints over one or more MPTCP subflows of the MPTCP session. All MPTCP subflows may be terminated. MPTCP session state information may be maintained after all MPTCP subflows have been terminated. Thus, a zero-subflow MPTCP session may be maintained. Additional MPTCP subflows may subsequently be added back to the MPTCP session using the maintained MPTCP session state information.

21 Claims, 6 Drawing Sheets

Establish MPTCP session including first MPTCP subflow with remote endpoint 602

Communicate application data via the first MPTCP subflow 604

Terminate the first MPTCP subflow 606

Maintain MPTCP session state information 608

Establish second MPTCP subflow using maintained MPTCP session state information 610

LONG-LIVED MPTCP SESSIONS

FIELD

The present disclosure relates to electronic devices, and more particularly to a system and method for maintaining long-lived multipath transmission control protocol (MPTCP) sessions.

DESCRIPTION OF THE RELATED ART

MPTCP is a transport layer protocol built on top of traditional TCP to provide a transport layer on which applications can send/receive data over multiple paths. For example, multipath TCP may be used to aggregate TCP connections or subflows created over multiple networks on a multihomed device into one single pipe or trunk for sending/receiving data.

SUMMARY

Techniques for supporting 'long lived' or 'semi-'persistent' MPTCP sessions with zero subflow support are described herein. Instead of closing an MPTCP session when closing all MPTCP subflows of the MPTCP session, the endpoints spanned by the MPTCP session may maintain MPTCP session state information for the MPTCP session.

By doing so, the endpoints may be able to re-establish an MPTCP subflow as part of the same MPTCP session if further data transport is desired at a later time rather than establishing an entirely new MPTCP session. Adding an MPTCP subflow to an existing MPTCP session in this manner may reduce the setup delay before data exchange can again occur relative to establishing an entirely new MPTCP session.

Techniques are also described herein for accelerating data exchange when adding an MPTCP subflow to an existing MPTCP session. Such techniques may be used when adding a subflow to an MPTCP session in a zero subflow state to compound the reduction in setup delay relative to establishing an entirely new MPTCP session, or may be used independently (e.g., in an MPTCP session with one or more already existing subflows).

The techniques for accelerating data exchange when adding an MPTCP subflow to an existing MPTCP session may include sending application data over an MPTCP subflow while that MPTCP subflow is in a pre-established state. For example, rather than waiting for a four-step handshake procedure to complete prior to sending application data, an endpoint may send application data between sending a SYN and receiving a SYN/ACK, or alternatively between sending an ACK and receiving an ACK, as part of the handshake procedure to add an MPTCP subflow. The other endpoint may be configured to authenticate the application data while the subflow is in the pre-established state using previously established MPTCP session state information.

The techniques described herein may be implemented in and/or used with a number of different types of devices, including but not limited to portable media players, cellular phones, tablet computers, set top box devices, television systems, load balancers, servers, and other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which.

Figure 1:
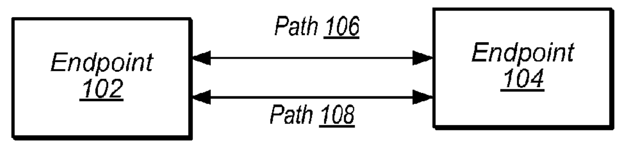
FIGS. 1-2 illustrate exemplary communication systems.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
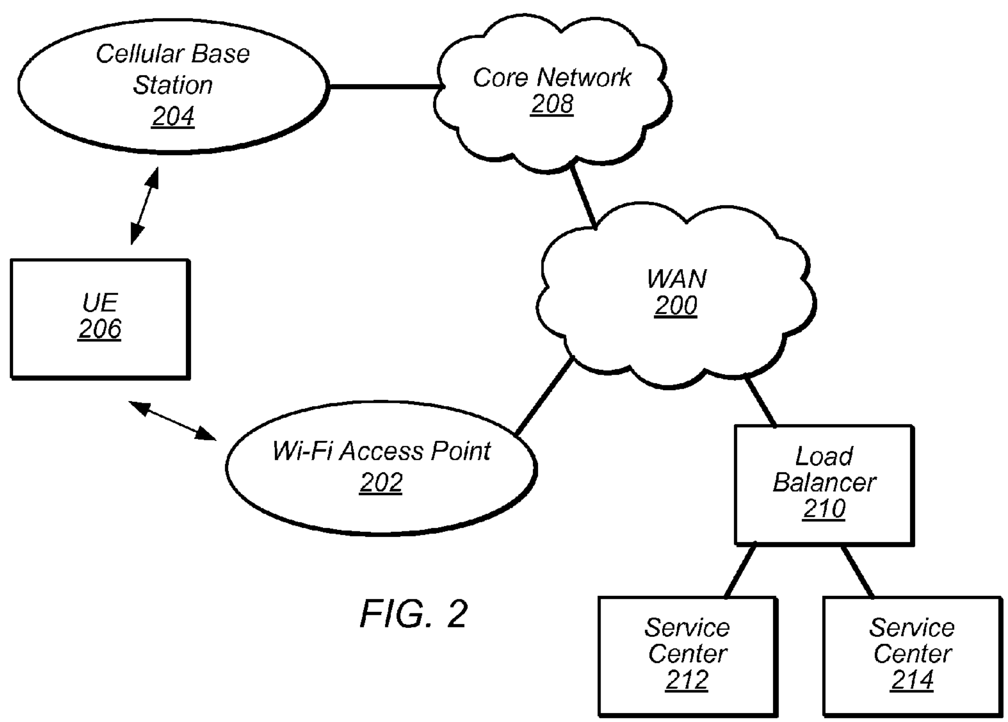

FIGS. 1-2—Communication System

FIGS. 1-2 illustrate exemplary (and simplified) communication systems. It is noted that the systems of FIGS. 1-2 are merely examples of possible systems, and embodiments may be implemented in any of various systems, as desired.

The exemplary wireless communication system illustrated in FIG. 1 includes two endpoints having multiple communication paths between them. Thus, endpoint 102 may be capable of communicating with endpoint 104 via path 106 or path 108.

Each of endpoint 102 and endpoint 104 may be a 'fixed' or 'mobile' endpoint. A fixed endpoint may be an endpoint which is substantially stationary and/or which communicates by way of one or more wired communication techniques. Some examples might include a server computer providing cloud-based services via the Internet, a bridge, a load balancer, a personal desktop computer or workstation, a set top box, a television, etc. A mobile endpoint may be an endpoint which is substantially mobile and/or which communicates by way of one or more wireless communication techniques. Some examples might include a mobile telephone or smart phone, tablet computer, portable gaming device, portable media player, etc. Note that hybrid endpoints which share traits of both fixed and mobile endpoints are also possible. For example, many laptop computers may be capable of performing both wireless (e.g., Wi-Fi) and wired (e.g., Ethernet) communication, and additionally may be capable of substantial movement (e.g., when operating from batter reserve power) or may be substantially stationary (e.g., when docked and/or connected to a wall outlet for power) at various times.

One or both of endpoints 102, 104 may be multihomed. For example, one or both of endpoint 102, 104 may be capable of communicating via multiple network interfaces. As such, there may be multiple possible communication paths 106, 108 between endpoints 102, 104. Note that although two paths (i.e., path 106 and path 108) are illustrated in FIG. 1, it should be noted that any number of paths may exist between endpoints. For example, if each of endpoints 102, 104 are capable of communicating via two different network interfaces, there might be four possible communication paths between them. Other numbers of different network interfaces and possible communication paths are also possible.

The multiple communication paths 106, 108 may be used to establish a multipath transmission control protocol (MPTCP) session or connection between endpoints 102 and 104. The MPTCP session may be established according to and/or include any of various features described in the MPTCP specification IETF RFC 6824. For example, one subflow of the MPTCP connection may be established over path 106, while another subflow of the MPTCP connection may be established over path 108. Such an MPTCP connection may be established and configured/controlled according to various aspects of the present disclosure.

The exemplary wireless communication system illustrated in FIG. 2 represents one possible communication system having the characteristics of the exemplary communication system illustrated in FIG. 1. In particular, a first endpoint (i.e., a wireless user equipment ("UE") device 206) may be capable of communicating with another endpoint (i.e., load balancer 210) using either of a first communication path (i.e., via cellular base station 204, core network 208, and wide area network 200) or a second communication path (i.e., via Wi-Fi access point 202 and wide area network 200).

As shown, the UE device 206 communicates with a Wi-Fi access point 202 and with a cellular base station 204. The access point 202 may be an access point providing a wireless local area network (WLAN). The access point 202 may be equipped to communicate with a wide area network (WAN) 200, such as the Internet. Thus, the access point 202 may facilitate communication between the UE 206 and the network 200. The access point 202 and the UE 206 may be configured to communicate over the transmission medium using Wi-Fi, including any of various versions of IEEE 802.11 (e.g., a, b, g, n, ac, etc.). Note that the access point 202 may also facilitate communication between the UE and other computing devices which also participate in the WLAN directly.

The base station 204 may be a base transceiver station (BTS) or cell site (a "cellular base station"), and may include hardware that enables wireless communication with cellular devices (such as UE 206) according to one or more cellular communication protocols. The UE 206 and the cellular base station 204 may communicate using any of various cellular communication technologies such as GSM, UMTS (WCDMA, TCS-CDMA), LTE, LTE-Advanced (LTE-A), 3GPP2 CDMA2000 (e.g., 1×RTT, 1×EV-DO, HRPD, eHRPD), etc.

As shown, the cellular base station may be equipped to communicate with a core network 208 of a cellular service provider. Thus, the base station 204 may facilitate communication between the UE 206 and the core network 208. The core network 208 may in turn be equipped to communicate with WAN 200 (e.g., the Internet, or another wide area network). Note that the core network 208 may also or alternatively be equipped to communicate with one or more other networks (e.g., a telecommunication network such as a public switched telephone network (PSTN), one or more core networks of other cellular service providers, etc.). The cellular base station 204 may thus provide the UE 206 (and potentially numerous other UEs) with various telecommunication capabilities, such as voice and SMS services and/or data services.

Thus, UE 206 may be capable of communicating using multiple wireless communication standards, including at least one wireless networking protocol (e.g., Wi-Fi) and at least one cellular communication protocol (e.g., GSM, UMTS (WCDMA), LTE, LTE-Advanced (LTE-A), 3GPP2 CDMA2000 (e.g., 1×RTT, 1×EV-DO, HRPD, eHRPD), etc.). Note additionally that the UE 206 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. In addition, or as an alternative, the UE 206 may be capable of communicating using one or more wired communication standards. For example, the UE 206 may be capable of communicating with one or more wired access points, e.g., via Ethernet. It may, for example, be possible for the UE 206 to couple via wired means to the Wi-Fi access point 202 in addition to or as an alternative to utilizing Wi-Fi communication. Other combinations of wireless and wired communication standards (including more than two wireless and/or wired communication standards) are also possible.

The load balancer 210 may also be equipped to communicate with WAN 200. The load balancer 210 may provide access to a cluster or server farm configured to provide one or more cloud-based services via the Internet. For example, as shown, the load balancer may further be equipped to communicate with service centers 212, 214, which may each include one or more computing devices (e.g., servers) configured to provide cloud-based services. Each service center might, for example, be configured to provide service with respect to a particular application, such as a mapping application, an intelligent personal assistant application, an e-commerce application, a media streaming application, a gaming application, etc. It should be noted that while load balancer 210 is shown in FIG. 2 as one possible exemplary access port (and potential MPTCP endpoint) to service centers 212, 214, any of various devices may be used (alternatively or in combination with load balancer 210) as intermediary/access port devices/entities to the service centers 212, 214 if desired, such as gateways, routers, firewalls, and/or any of various other "middleboxes". In addition, it should be noted that while not explicitly shown, the load balancer 210 may include any number of network interfaces for connecting to the WAN 200, including one or more wired network interfaces and/or one or more wireless network interfaces.

Figure 3:
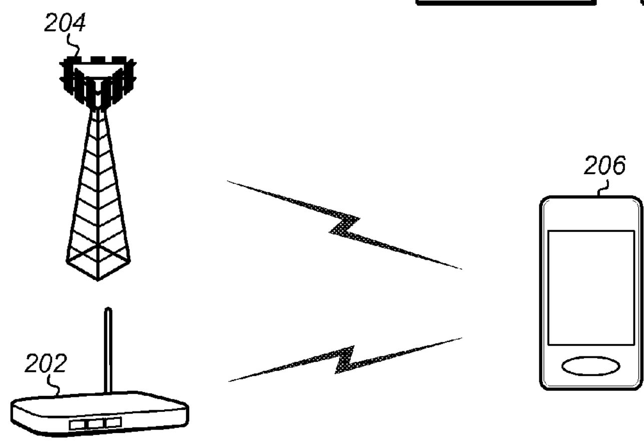
FIG. 3 illustrates a cellular base station and a Wi-Fi access point in communication with a wireless user equipment device.

FIG. 3 illustrates the UE device 206 in communication with the cellular base station 204 and the Wi-Fi access point 202. The UE 206 may be a device with multiple wireless network connectivity such as a mobile phone, a hand-held device, a computer or a tablet, or virtually any type of wireless device.

The UE 206 may include a processor that is configured to execute program instructions stored in memory. The UE 206 may perform any of the method embodiments described herein by executing such stored instructions. Alternatively, or in addition, the UE 206 may include a programmable hardware element such as an FPGA (field-programmable gate array) that is configured to perform any of the method embodiments described herein, or any portion of any of the method embodiments described herein.

The UE 206 may be configured to communicate using any of multiple wireless communication protocols. For example, the UE 206 may be configured to communicate using at least one cellular communication protocol (such as CDMA2000, LTE, LTE-A, etc.) and Wi-Fi. Other combinations of wireless and/or wired communication standards are also possible.

The UE 206 may include one or more antennas for communicating using one or more wireless communication protocols. The UE 206 may share one or more parts of a receive and/or transmit chain between multiple wireless communication standards; for example, the UE 206 might be configured to communicate using either of CDMA2000 (1×RTT/1×EV-DO/HRPD/eHRPD) or LTE using partially or entirely shared wireless communication circuitry (e.g., using a shared radio or at least shared radio components). The shared communication circuitry may couple to a single antenna, or to multiple antennas (e.g., for MIMO) for performing wireless communications. Alternatively, the UE 206 may include separate transmit and/or receive chains (e.g., including separate antennas and other radio components) for each wireless communication protocol with which it is configured to communicate. As a further possibility, the UE 206 may include one or more radios or radio components which are shared between multiple wireless communication protocols, and one or more radios or radio components which are used exclusively by a single wireless communication protocol. For example, the UE 206 might include a shared radio for communicating using either of LTE or CDMA2000 1×RTT (or either of LTE or GSM), and separate radios for communicating using each of Wi-Fi and Bluetooth. Other configurations are also possible.

Figure 4:
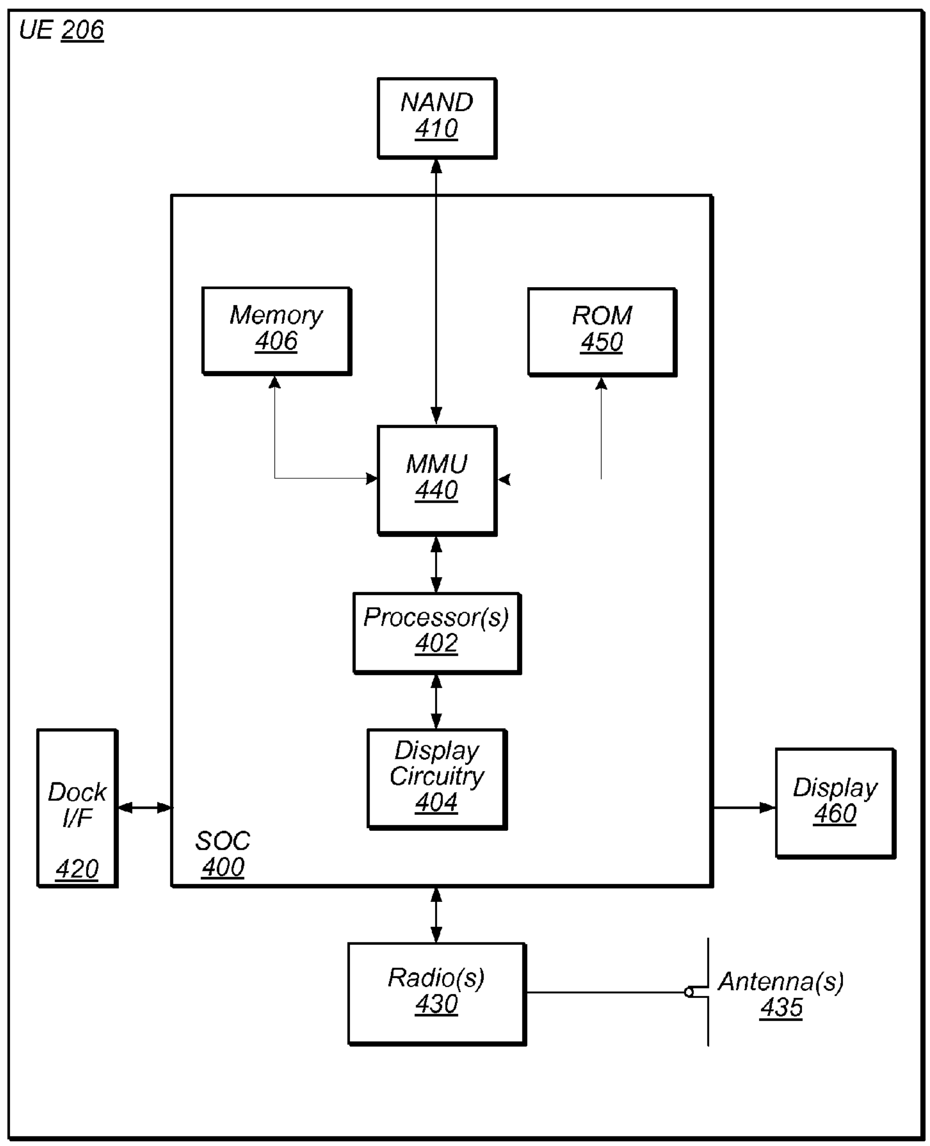
FIG. 4 illustrates an exemplary block diagram of a wireless user equipment device.

FIG. 4—Exemplary Block Diagram of a UE

FIG. 4 illustrates an exemplary block diagram of a UE 206. As shown, the UE 206 may include a system on chip (SOC) 400, which may include portions for various purposes. For example, as shown, the SOC 400 may include processor(s) 402 which may execute program instructions for the UE 206 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430 (also referred to as a "radio"), connector I/F 420, and/or display 460. The MMU 440 may be configured to perform memory protection and page table translation or set up. In some embodiments, the MMU 440 may be included as a portion of the processor(s) 402.

As shown, the SOC 400 may be coupled to various other circuits of the UE 206. For example, the UE 206 may include various types of memory (e.g., including NAND flash 410), a connector interface 420 (e.g., for coupling to a computer system, dock, charging station, etc.), the display 460, and one or more radios 430 (e.g., for LTE, LTE-A, CDMA2000, Bluetooth, Wi-Fi, GPS, etc.).

As noted above, the UE 206 may be configured to communicate wirelessly using multiple wireless communication standards. As further noted above, in such instances, the radio(s) 430 may include radio components which are shared between multiple wireless communication standards and/or radio components which are configured exclusively for use according to a single wireless communication standard. As shown, the UE device 206 may include at least one antenna 435 (and possibly multiple antennas, e.g., for MIMO and/or for implementing different wireless communication technologies, among various possibilities), for performing wireless communication with base stations, access points, and/or other devices.

The UE 206 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

As described herein, the UE 206 may include hardware and software components for implementing features for supporting long-lived MPTCP sessions and/or accelerated data exchange when adding an MPTCP subflow to an existing MPTCP session, such as those described herein with reference to, inter alia, FIGS. 6-9. The processor 402 of the UE device 206 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 206, in conjunction with one or more of the other components 400, 404, 406, 410, 420, 430, 435, 440, 450, 460 may be configured to implement part or all of the features described herein, such as the features described herein with reference to, inter alia, FIGS. 6-9.

Figure 5:
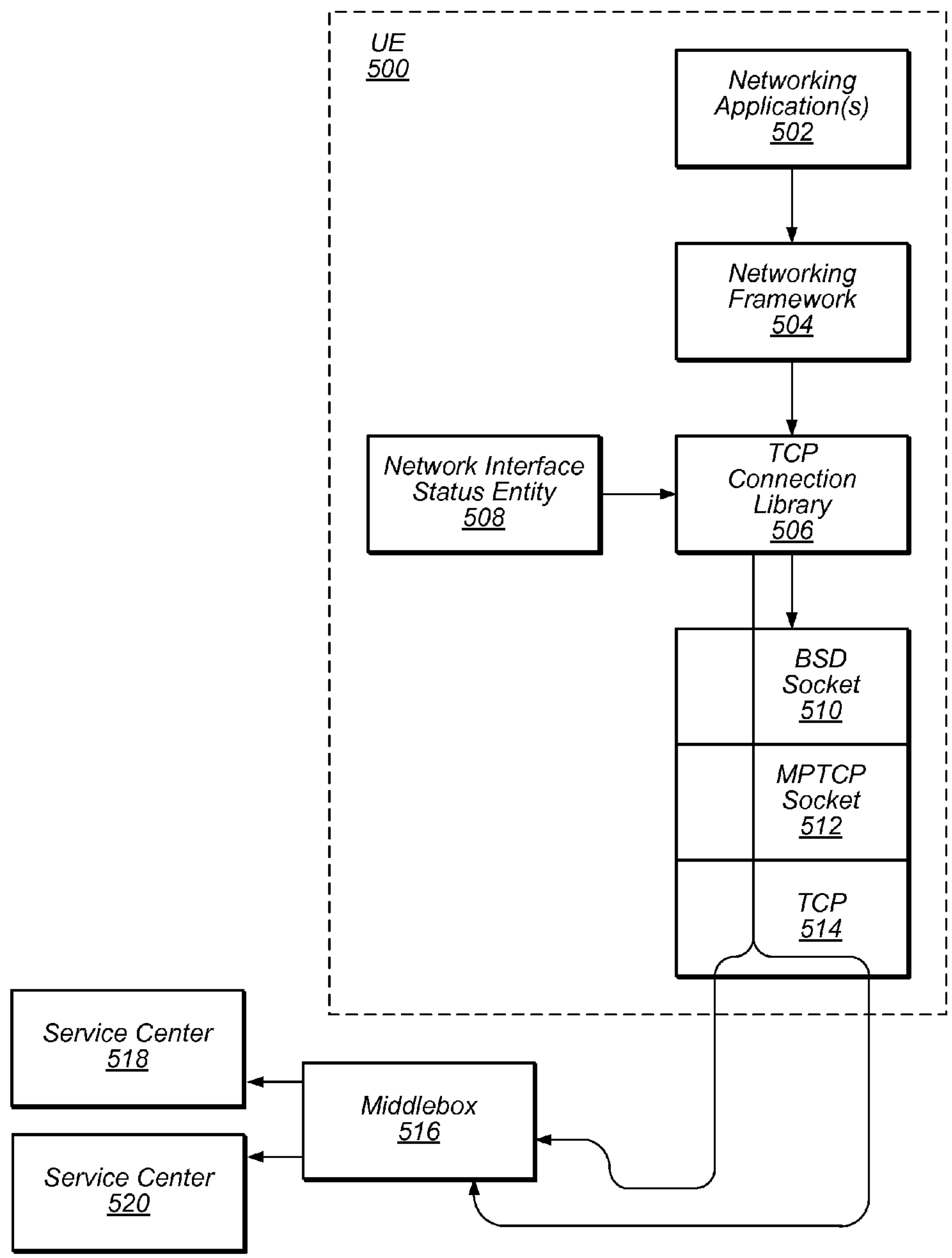
FIG. 5 illustrates an exemplary protocol stack which may be used in conjunction with multipath transmission control protocol communications.

FIG. 5—MPTCP Capable Protocol Stack

FIG. 5 illustrates an exemplary protocol stack which may be used by a UE 500 to establish, configure, and control MPTCP connections and subflows between the UE 500 and a middlebox 516 (which may provide redirection thence to service centers 518, 520), according to various aspects of the present disclosure. It should be recognized that while the exemplary protocol stack illustrated in FIG. 5 represents one possible protocol stack which may be used to implement aspects of the present disclosure, MPTCP connections and subflows may be established, configured, and/or controlled in conjunction with any of numerous alternate protocol stacks, in conjunction with different devices than UE 500 and middlebox 516 and/or service centers 518, 520 (e.g., without an intermediary middlebox 516 or with multiple middleboxes). As such, the exemplary protocol stack illustrated in FIG. 5 should not be considered limiting to the disclosure as a whole.

As shown, one or more networking applications 502 may be executing on the UE 500. The networking application(s) may include any application(s) which utilize a network connection to communicate over a network. For example, the application(s) (or "app(s)") 502 may include a browser application, email application, chat application, social media application, media streaming application, game application, intelligent personal assistant application, mapping application, and/or any of a variety of other types of networking applications.

The networking application(s) 502 may interface with a networking framework 504, which may be provided by an operating system executing on the UE 500. The networking framework 504 may provide a level of abstraction between the application 502 and the lower level networking functionality provided by the UE 500. The networking framework 504 may in turn interface with a TCP connection library entity 506. The TCP connection library 506 may have knowledge of the status of various network interfaces, by way of communication with a network interface status entity 508.

The network interface status entity 508 may monitor the up/down status and support network interface upkeep of various network interfaces available to the UE 500. Information regarding the status of the various network interfaces available to the UE 500 may be particularly helpful for a mobile device which is capable of utilizing one or more forms of wireless communication, such as cellular communication and Wi-Fi. For example, the network interface status entity 508 may be aware of whether or not a cellular data link is available at any given time, and may similarly be aware of whether or not a Wi-Fi link is available at any given time. The network interface status entity 508 may similarly monitor any additional or alternative network interfaces as well. In some cases the network interface status entity 508 may also be aware of any further considerations relating to various available network interfaces, such as network interface use preferences. For example, for many mobile devices, Wi-Fi data communication may be less expensive than cellular data communication (e.g., if a cellular service provider offers metered data usage while a Wi-Fi service provider offers unmetered data usage); in such a case, a preference to use a Wi-Fi network interface rather than a cellular network interface for data communication when possible may be noted by the network interface status entity 508 in the UE 500. Other preferences or considerations may also or alternatively be stored.

Being aware of such information by way of its communication with the network interface status entity 508, then, the TCP connection library 506 may act as a transport connection manager and intelligently manage TCP connections for the networking application 502. For example, the TCP connection library 506 may be capable of initiating and tearing down TCP connections (including MPTCP subflows) with networked entities (such as middlebox 516) via various network interfaces, establishing and/or modifying MPTCP subflow priorities, and asserting control over MPTCP subflow creation and priority status modification, among various possibilities. The TCP connection library 506 may do so by way of socket layers BSD socket 510, MPTCP socket 512, and TCP connection/subflows 514.

As shown, the resulting MPTCP subflow(s) may be established as part of an MPTCP connection with the middlebox 516. The middlebox 516 may include any of a variety of types of middlebox functionality, such as a firewall, load balancing, network address translation, etc. The middlebox 516 may in turn route data to service center 518 or service center 520, and possibly more specifically to a server acting as part of service center 518 or 520 in a separate connection (e.g., according to a load balancing algorithm). Each service center 518, 520 may be configured (e.g., may be specifically built and/or arranged) for a particular application. Thus, the middlebox 516 may redirect an application stream received over an MPTCP connection with the UE 500 accordingly to the nature of the networking application 502. For example, if an application stream for a mapping application is communicated to middlebox 516 from the UE 500, and service center 518 is a service center for that mapping application, the application stream may be redirected by middlebox 516 to service center 518. If an application stream for an intelligent personal assistant application is communicated to middlebox 516 from the UE 500, and service center 520 is a service center for that intelligent personal assistant application, the application stream may be redirected by middlebox 516 to service center 520.

Figure 6:
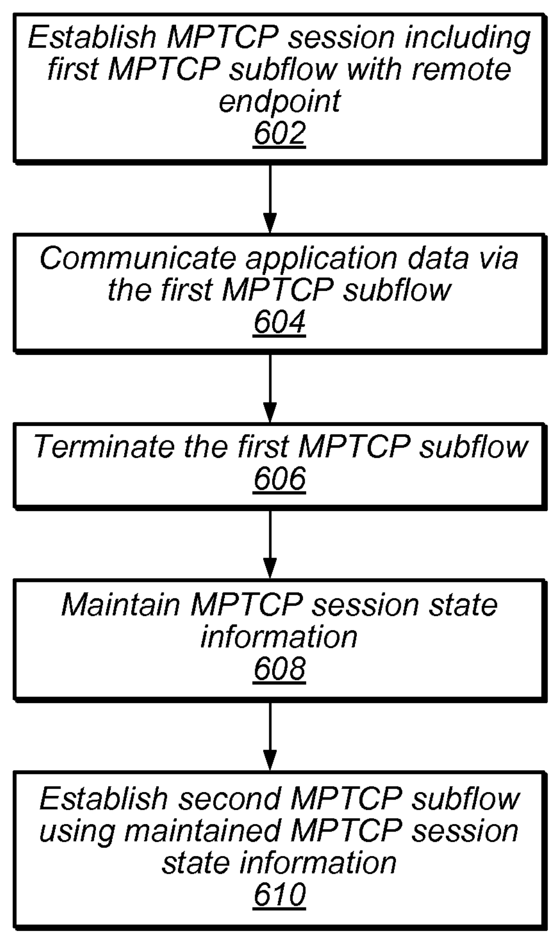
FIG. 6 is a flowchart diagram illustrating aspects of a method for maintaining long-lived MPTCP sessions.

FIG. 6—Long-Lived MPTCP Sessions

FIG. 6 is a flowchart diagram illustrating an exemplary process for an electronic device to maintain a long-lived MPTCP session with a remote endpoint. The process may enable two endpoints between which such a long-lived MPTCP session exists to rapidly re-establish an MPTCP subflow and resume data exchange after a period of time during which no subflows existed between the two endpoints.

The method shown in FIG. 6 may be used in conjunction with any of the computer systems or devices shown in the above Figures, among other devices. Some of the method elements shown may be performed concurrently, in a different order than shown, or may be omitted. Additional method elements may also be performed as desired. As shown, the method may operate as follows.

In 602, an MPTCP session may be established between the device implementing the method and a remote endpoint. The MPTCP session may be initiated by either the device or the remote endpoint. Establishing the MPTCP session may include performing a TCP (e.g., SYN/ACK) handshake procedure including an "MP_CAPABLE" option. A first subflow between the device and the remote endpoint may be established as part of establishing the MPTCP session.

The MP_CAPABLE options exchanged by the endpoints establishing the MPTCP session may include authentication information which may be used to maintain session security and authenticate new subflows of the MPTCP session. For example, each endpoint may provide the other endpoint with a key for that endpoint.

The MPTCP session may be established as a socket for a particular application executing on the device and/or the remote endpoint. For example, a user request to send or retrieve certain data via the application to or from the remote endpoint may have been received at the device or the remote endpoint, and the MPTCP session may be established in order to enable data exchange between the endpoints according to the user request. Other reasons for establishing the MPTCP session (e.g., background data transfers, incoming calls or push notifications, etc.) are also possible.

In 604, once the MPTCP session (including the first subflow) is established, application data may be communicated via the first MPTCP subflow. Communication of the application data may include sending application data from the device to the remote endpoint and/or receiving application at the device from the remote endpoint. The communication may be reliable, and thus each endpoint may send acknowledgements upon successful receipt of data from the other endpoint.

If desired, any number of additional MPTCP subflows may additionally be established (e.g., using TCP handshake procedures with "MP_JOIN" options) between the device and the remote endpoint in addition to the first MPTCP subflow. Such additional subflows may be established over at least partially different network paths than the first MPTCP subflow and each other. For example, if the first MPTCP subflow is established via a Wi-Fi network interface of the device, another MPTCP subflow might be established via a cellular network interface of the device. Application data may also be communicated over any such additional MPTCP subflows.

In 606, the first MPTCP subflow may be terminated. If any additional MPTCP subflows have been created, these may also be terminated. Once any desired application data has been communicated via the first subflow (and any additional subflows), there may be no further need to maintain active subflows of the MPTCP session. Accordingly, each active MPTCP subflow may be closed, for example by the device and the remote endpoint exchanging TCP FIN flags on each subflow. Thus, after termination of all active MPTCP subflows, the MPTCP session may include zero MPTCP subflows.

In 608, MPTCP session state information for the MPTCP session may be maintained. In other words, even though the MPTCP session does not include any MPTCP subflows, state information such as authentication information and a current data sequence number of the MPTCP session may be stored at both the electronic device and the remote endpoint.

In 610, a second MPTCP subflow may be established using the maintained MPTCP session state information. The second MPTCP subflow may be established at a later time, for example based on a new user request to exchange application data between the device and the remote endpoint.

Establishing the second MPTCP subflow may, for example, include exchanging a TCP handshake with MP_JOIN options between the electronic device and the remote endpoint. The MP_JOIN options may include authentication information stored (or generated based on information stored) as part of the MPTCP session state information. The second MPTCP subflow may be initiated by either of the electronic device or the remote endpoint.

Once the second MPTCP subflow has been established, further application data may be communicated between the electronic device and the remote endpoint via the second MPTCP subflow.

Thus, the device and the remote endpoint may be able to re-establish (add) a subflow to an MPTCP session which has been maintained with zero subflows. Adding a subflow to an existing MPTCP session in such a manner may be simpler and more rapid than establishing an entirely new MPTCP session, for example since each endpoint may already have authentication information for the MPTCP session and may thus be able to skip generating such information anew.

Long-lived MPTCP sessions such described herein according to the method of FIG. 5 may be contrasted with semi-persistent or long lived TCP connections (or, similarly, long-lived MPTCP subflows). For example, such a long-lived MPTCP session as described herein may not require any keep-alive type traffic or session data to be maintained by various middleboxes spanning the electronic device and the remote endpoint, but may instead be kept alive simply by storing the MPTCP session state information at each endpoint. In contrast, to maintain a semi-persistent or long lived TCP connection without active data traffic would require periodic keep-alive type traffic, and might further require various middleboxes not under the control of either endpoint to maintain session state information (e.g., for internet service provider (ISP) network address translation (NAT), etc.).

In some instances, data exchange between the electronic device and the remote endpoint may be 'accelerated' when adding an MPTCP subflow to an existing MPTCP session, for example when adding an MPTCP subflow to a zero-subflow MPTCP session such as in 610, if desired. For example, data exchange may be initiated while the second MPTCP subflow is in a pre-established state (i.e., before the TCP handshake procedure with the MP_JOIN options is complete). Examples and further details of such possible accelerated data exchanges are further described herein below with respect to FIGS. 8-9.

Figure 7:
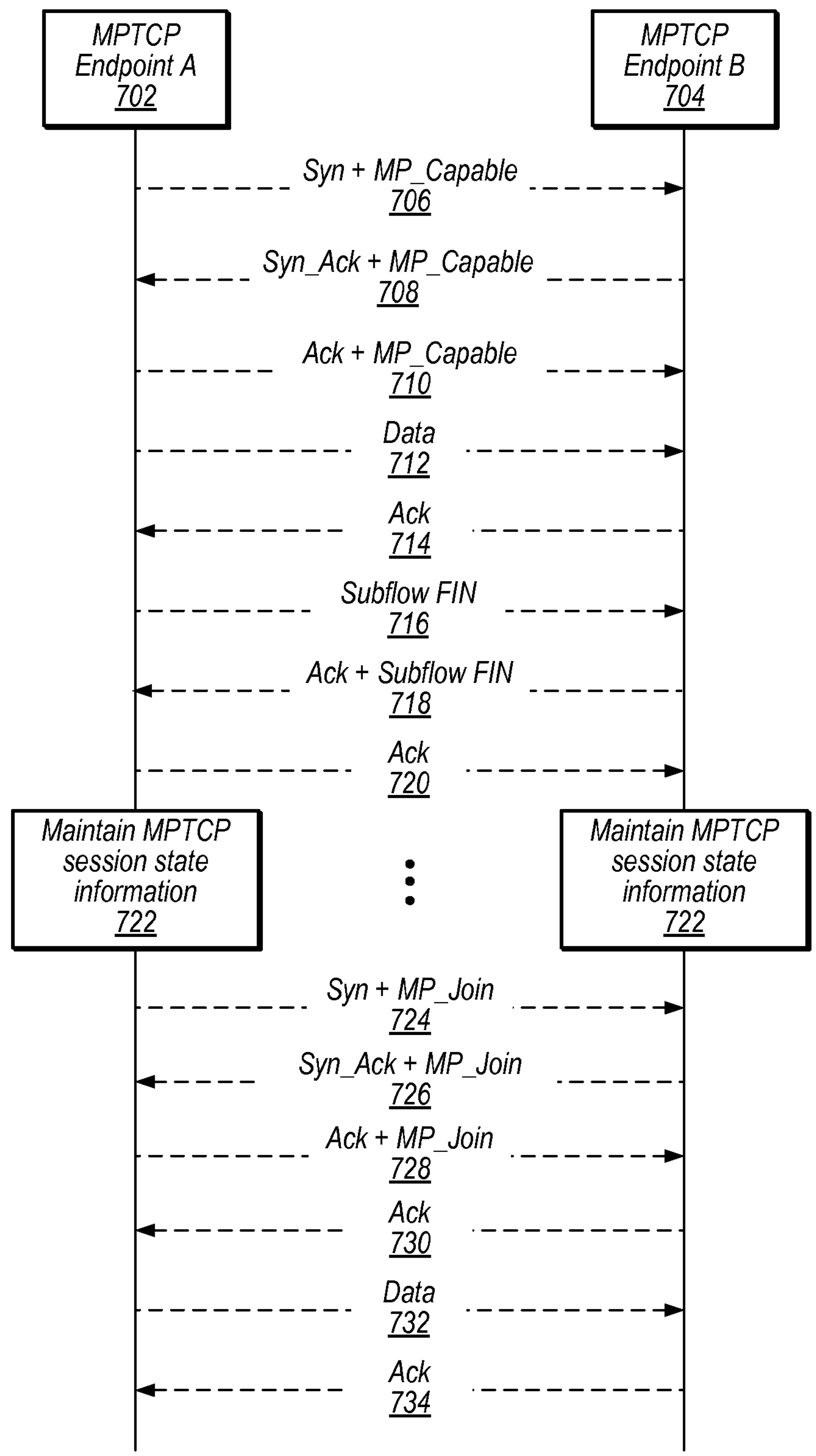
FIG. 7 is a message sequence diagram illustrating an exemplary message sequence flow which might occur between endpoints configured to maintain a long lived MPTCP session.
Figure 8:
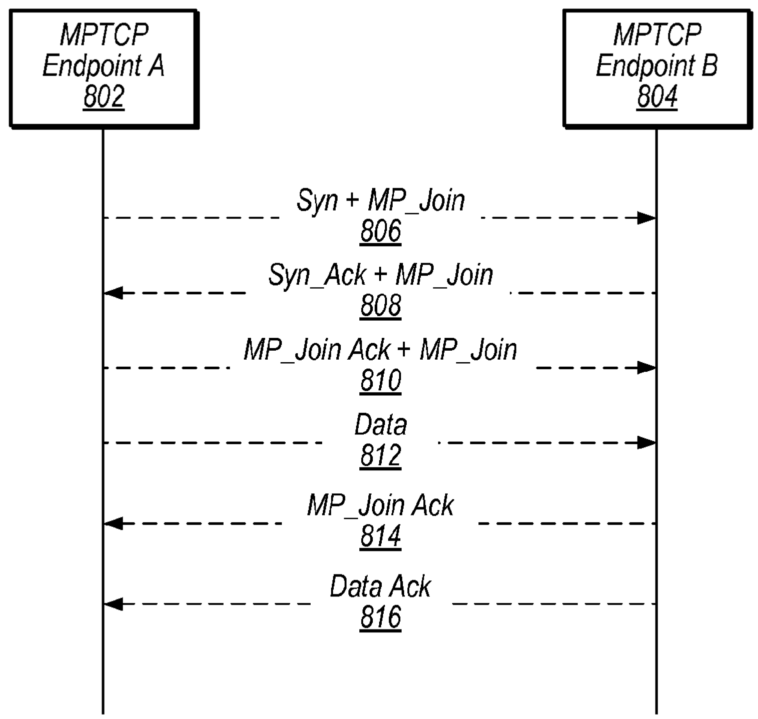
FIGS. 8-9 are a message sequence diagrams illustrating exemplary sequence flows featuring accelerated data exchange when adding a subflow to an existing MPTCP session.
Figure 9:
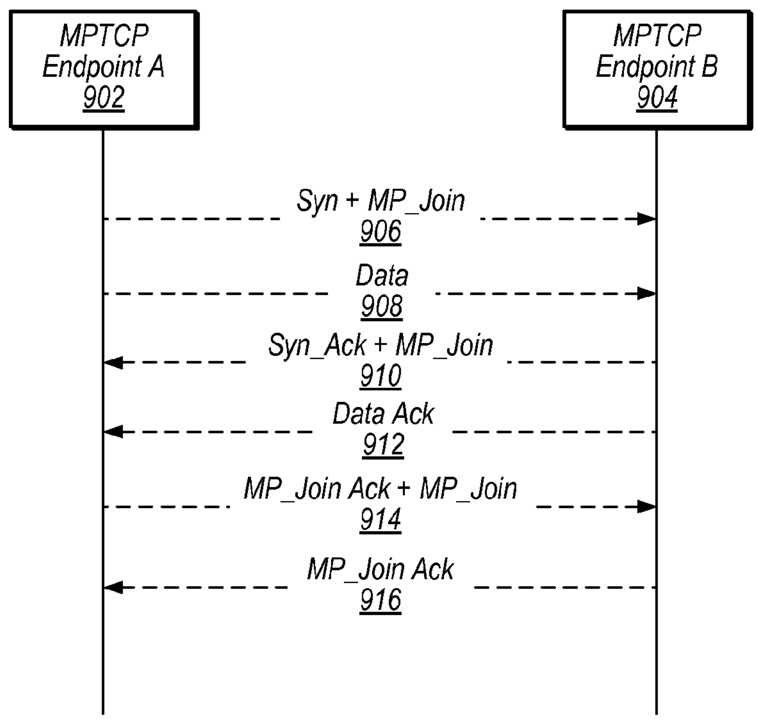

FIGS. 7-9—Exemplary Signal Flows

FIGS. 7-9 are signal flow diagrams illustrating exemplary signal flows between various devices (referred to as 'MPTCP Endpoint A' 702 and 'MPTCP Endpoint B' 704, or alternatively as 'endpoint A' and 'endpoint B' for simplicity) which may implement aspects of the method of FIG. 6. For example, the signal flow illustrated in FIG. 7 may occur when implementing techniques for supporting long-lived MPTCP sessions, while the signal flows illustrated in FIGS. 8-9 may occur when implementing techniques for accelerated data exchange when adding a new subflow to an existing MPTCP session.

The signal flows shown in FIGS. 7-9 may be used in conjunction with any of the computer systems or devices shown in the above Figures, among other devices. Some of the signal flows shown may be performed concurrently, in a different order than shown, or may be omitted. Additional method elements may also be performed as desired. As shown, the signal flow may operate as follows.

In 706, endpoint A may send a SYN message which includes an MP_CAPABLE option to endpoint B to initiate an MPTCP handshake procedure. The MP_CAPABLE option may include a key for endpoint A ('key A').

In 708, endpoint B may send a SYN/ACK message which includes an MP_CAPABLE option to endpoint A to proceed with the MPTCP handshake procedure. The MP_CAPABLE option may include a key for endpoint B ('key B').

In 710, endpoint A may send an ACK message which includes an MP_CAPABLE option to endpoint B to complete the MPTCP handshake procedure. The MP_CAPABLE option may include both endpoints' keys (key A and key B). At this point the MPTCP session may be established, and may include a first subflow (i.e., a subflow over which the TCP handshake procedure with MP_CAPABLE options were communicated and the MPTCP session was established).

In 712, endpoint A may send data (e.g., application data) to endpoint B via the first subflow. The data may utilize transport layer security (TLS) based on the authentication information exchanged when establishing the MPTCP session.

In 714, endpoint B may acknowledge the data sent by endpoint A. Note also that although not shown, endpoint B may also send data to endpoint A (e.g., a response to the data sent by endpoint A), which may in turn be acknowledged by endpoint A.

In 716, endpoint A may send a subflow FIN message to endpoint B. Endpoint A may send such a message once it has no further data to exchange with endpoint B.

In 718, endpoint B may acknowledge the subflow FIN message sent by endpoint A and include its own subflow FIN message to indicate that it also has no further data to exchange with endpoint A.

In 720, endpoint A may acknowledge the subflow FIN message sent by endpoint B. At this point, the first subflow may be closed, and the MPTCP session between endpoint A and endpoint B may not include any subflows. The MPTCP session itself may not be closed, however, as neither endpoint A nor endpoint B may have sent or acknowledged an MPTCP level DATA_FIN message.

In 722, each of endpoint A and endpoint B may maintain (store) MPTCP session state information for the MPTCP session. This may include storing key A and key B, a most recent data sequence number for the MPTCP session, and/or various other information.

In 724, endpoint A may send a SYN message with an MP_JOIN option to endpoint B, thus initiating establishment of a second subflow. The MP_JOIN option may use keying material that was originally exchanged in the initial MP_CAPABLE handshake, and which is stored as part of the MPTCP session state information. For example, the MP_JOIN option may include a 'token B' which may be a cryptographic hash of key B, as well as a nonce or random number for A ('nonce A') and A's address ID.

In 726, endpoint B may send a SYN/ACK message with an MP_JOIN option to endpoint A. This MP_JOIN option may likewise use keying material that was originally exchanged in the initial MP_CAPABLE handshake, as well as information from endpoint A's SYN message. For example, the MP_JOIN option may include a truncated hash-based message authentication code for endpoint B ('HMAC B') based on nonce A, key A, and key B, as well as a nonce or random number for B ('nonce B') and B's address ID.

In 728, endpoint A may send an ACK message with an MP_JOIN option to endpoint B. This MP_JOIN option may also use keying material that was originally exchanged in the initial MP_CAPABLE handshake, as well as information from endpoint B's SYN/ACK message. For example, the MP_JOIN option may include a truncated hash-based message authentication code for endpoint A ('HMAC A') based on nonce B, key A, and key B.

In 730, endpoint B may acknowledge endpoint A's ACK message with the MP_JOIN option. At this point, each endpoint may have authenticated itself to the other endpoint, and the second subflow may be established.

In 732, endpoint A may send data (e.g., application data) to endpoint B via the second subflow.

In 734, endpoint B may acknowledge the data sent by endpoint A. Note also that although not shown, endpoint B may also send data to endpoint A (e.g., a response to the data sent by endpoint A), which may in turn be acknowledged by endpoint A.

Turning next to FIGS. 8-9, as previously noted, the illustrated signal flows may be used in conjunction with methods for accelerated data exchange when adding an MPTCP subflow to an existing MPTCP session. In particular, the illustrated signal flows may be used to initiate data exchange between endpoints (e.g., endpoint A 802 and endpoint B 804 in FIG. 8, or endpoint A 902 and endpoint B 904 in FIG. 9) on an MPTCP subflow while that MPTCP subflow is still in a pre-established state. For example, using the signal flow illustrated in FIG. 8, it may be possible to begin exchanging data on an MPTCP subflow after just one round-trip-time instead of after the two round-trip-times required to complete the handshake procedure to add an MPTCP subflow to an existing MPTCP session.

As shown in FIG. 8, in 806 endpoint A may initiate establishment of the MPTCP subflow by sending a SYN message with an MP_JOIN option to endpoint B. The MP_JOIN option may use keying material that was originally exchanged in an initial MP_CAPABLE handshake, and which may be stored as part of MPTCP session state information, such as previously described herein with respect to FIG. 7.

In 808, endpoint B may send a SYN/ACK message with an MP_JOIN option to endpoint A. Again as previously described herein with respect to FIG. 7, this MP_JOIN option may use keying material that was originally exchanged in the initial MP_CAPABLE handshake, as well as information from endpoint A's SYN message.

In 810, endpoint A may send an ACK message with an MP_JOIN option to endpoint B. Again as previously noted, this MP_JOIN option may also use keying material that was originally exchanged in the initial MP_CAPABLE handshake, as well as information from endpoint B's SYN/ACK message.

In 812, rather than waiting for endpoint B to acknowledge endpoint A's ACK message with the MP_JOIN option to initiate data exchange, endpoint A may send data to endpoint B. The data may utilize transport layer security (e.g., based on keying information for endpoint A and endpoint B), if desired.

In 814, endpoint B may acknowledge endpoint A's ACK message with the MP_JOIN option. At this point, each endpoint may have authenticated itself to the other endpoint, and the second subflow may be established.

In 816, endpoint B may also acknowledge endpoint A's data. Note that in some instances, even though endpoint A may have sent data to endpoint B before finalizing the subflow establishment handshake procedure, endpoint B may receive and respond to endpoint A's ACK message with the MP_JOIN option prior to receiving endpoint A's data. Thus, from the perspective of endpoint B, the subflow may be established, and endpoint B may respond (i.e., by acknowledging endpoint A's data) in the same manner as if endpoint A had sent the data after completion of the subflow establishment handshake procedure. Further data exchange (e.g., from endpoint A to endpoint B and/or vice versa) may subsequently be performed on the (now established) subflow as desired.

Whereas according to the signal flow illustrated in FIG. 8 it may be possible to begin exchanging data on an MPTCP subflow after one round-trip-time, using the signal flow illustrated in FIG. 9, it may be possible to begin exchanging data on an MPTCP subflow immediately upon initiating establishment of the MPTCP subflow (i.e., after zero round-trip-times).

As shown, in 906 endpoint A may initiate establishment of the MPTCP subflow by sending a SYN message with an MP_JOIN option to endpoint B.

In 908, after sending the SYN message with the MP_JOIN option and prior to receiving a SYN/ACK message with MP_JOIN option in response, endpoint A may also send data to endpoint B. The data may utilize transport layer security (e.g., based on keying information for endpoint A and endpoint B), if desired. Additionally, the data may include a data sequence signal (DSS) option, which may contribute to authentication of such pre-establishment data exchange by endpoint A at endpoint B. In some instances, the data may include a random number as the ACK number, e.g., since endpoint A may not have received endpoint B's MP_JOIN response yet.

In 910, endpoint B may send a SYN/ACK message with an MP_JOIN option to endpoint A.

In 912, endpoint B may acknowledge endpoint A's data. Because authentication and security information may be maintained by each of endpoint A and endpoint B, endpoint B may be able to authenticate and thus accept endpoint A's data, even though the subflow is not yet fully established. For example, endpoint B may attempt to decrypt the data sent by endpoint A, and drop the data and the connection if decryption fails. If decryption is successful, endpoint B may accept the data, and may also authenticate endpoint A (e.g., even though it hasn't sent its HMAC yet). Endpoint B may also confirm that the MPTCP data sequence number of the data sent by endpoint A is consistent with session state information retained by endpoint B relating to the last MPTCP sequence number sent and/or received. Note also that endpoint B may be configured to ignore the ACK number of data received so early in the subflow establishment procedure, since as previously noted, it may not relate to any actual acknowledgement.

In 914, endpoint A may proceed with the handshake procedure and send an ACK message with an MP_JOIN option to endpoint B.

In 916, endpoint B may complete the handshake procedure and send an ACK message in response to endpoint A's ACK message with the MP_JOIN option to endpoint A.

Thus, endpoints may be able to initiate data exchange on an MPTCP subflow while the subflow is still in a pre-established state. This may potentially reduce the amount of time required (i.e., the latency) to begin exchanging data over the MPTCP subflow. Note that if for any of various reasons such accelerated data exchange is not successful (e.g., if one or more middleboxes drops data which is sent during pre-established stages of adding a subflow to an MPTCP session), it may still be possible to exchange such data once the subflow has been fully established.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 206) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method for an electronic device to perform multipath transmission control protocol (MPTCP) communication with a remote endpoint, the method comprising:

exchanging a TCP handshake with an MP_CAPABLE option with the remote endpoint, wherein the TCP handshake with the MP_CAPABLE option establishes a MPTCP session and with the remote endpoint and establishes a first MPTCP subflow of the MPTCP session;

communicating application data with the remote endpoint via the first MPTCP subflow;

terminating the first MPTCP subflow of the MPTCP session by including a TCP FIN flag with data communicated via the first MPTCP subflow, wherein after terminating the first MPTCP subflow the MPTCP session comprises zero MPTCP subflows between the electronic device and the remote endpoint; and maintaining MPTCP session state information at the electronic device with zero MPTCP subflows between the electronic device and the remote endpoint after terminating all MPTCP subflows of the MPTCP session.

2. The method of claim 1, wherein the MPTCP session state information comprises authentication information and a data sequence number.

3. The method of claim 1, further comprising, at a later time:

exchanging a TCP handshake with an MP_JOIN option with the remote endpoint, wherein the TCP handshake with the MP_JOIN option establishes a second MPTCP subflow of the MPTCP session, wherein exchanging the TCP handshake with the MP_JOIN option utilizes the maintained MPTCP session state information.

4. The method of claim 3, further comprising, at the later time:

sending application data over the second MPTCP subflow while the second MPTCP subflow is in a pre-established state.

5. The method of claim 3, wherein exchanging the TCP handshake with the MP_JOIN option with the remote endpoint comprises:

sending a SYN message with an MP_JOIN option from the electronic device to the remote endpoint;

receiving a SYN/ACK response with an MP_JOIN option from the remote endpoint at the electronic device;

sending an ACK response with an MP_JOIN option from the electronic device to the remote endpoint; and receiving an ACK response from the remote endpoint at the electronic device.

6. The method of claim 5, further comprising:

sending application data over the second MPTCP subflow after sending the SYN message with the MP_JOIN option to the remote endpoint and before receiving the SYN/ACK response with the MP_JOIN option from the remote endpoint.

7. The method of claim 5, further comprising:

sending application data over the second MPTCP subflow after sending the ACK response with the MP_JOIN option to the remote endpoint and before receiving the ACK response from the remote endpoint.

8. An electronic device, comprising:

one or more network interfaces; and a processing element operably coupled to the one or more network interfaces;

wherein the processing element and the one or more network interfaces are configured to:

establish a multipath transmission control protocol (MPTCP) session with a remote endpoint;

terminate all MPTCP subflows between the electronic device and the remote endpoint; and maintain the MPTCP session at the electronic device after all MPTCP subflows between the electronic device and the remote endpoint have been terminated.

9. The electronic device of claim 8, wherein maintaining the MPTCP comprises maintaining MPTCP session state information for the MPTCP session.

10. The electronic device of claim 9, wherein the MPTCP session state information comprises authentication information and a data sequence number.

11. The electronic device of claim 8, wherein the processing element and the one or more network interfaces are further configured to, at a later time:

add a MPTCP subflow between the electronic device and the remote endpoint as part of the MPTCP session using maintained MPTCP session state information.

12. The electronic device of claim 11, wherein the processing element and the one or more network interfaces are further configured to, at the later time:

send application data over the added MPTCP subflow while the added MPTCP subflow is in a pre-established state.

13. The electronic device of claim 12, wherein the application data sent over the added MPTCP subflow while the added MPTCP subflow is in a pre-established state is sent using transport layer security (TLS) information maintained as part of TLS session state information on each endpoint.

14. The electronic device of claim 12, wherein the processing element and the one or more network interfaces are further configured to, at the later time:

receive an acknowledgement to the application data sent from the remote endpoint over the added MPTCP subflow while the added MPTCP subflow is in a pre-established state.

15. An apparatus, comprising a processing element operably coupled to one or more network interfaces, wherein the processing element and the one or more network interfaces are configured to perform multipath transmission control protocol (MPTCP) communication with a remote endpoint, wherein performing MPTCP communication with the remote endpoint comprises:

exchanging a TCP handshake with an MP_CAPABLE option with the remote endpoint, wherein the TCP handshake with the MP_CAPABLE option establishes a MPTCP session and with the remote endpoint and establishes a first MPTCP subflow of the MPTCP session;

communicating application data with the remote endpoint via the first MPTCP subflow;

terminating the first MPTCP subflow of the MPTCP session by including a TCP FIN flag with data communicated via the first MPTCP subflow, wherein after terminating the first MPTCP subflow the MPTCP session comprises zero MPTCP subflows between the electronic device and the remote endpoint; and maintaining MPTCP session state information at the electronic device with zero MPTCP subflows between the electronic device and the remote endpoint after terminating all MPTCP subflows of the MPTCP session.

16. The apparatus of claim 15, wherein the MPTCP session state information comprises authentication information and a data sequence number.

17. The apparatus of claim 15, wherein performing MPTCP communication with the remote endpoint further comprises, at a later time:

exchanging a TCP handshake with an MP_JOIN option with the remote endpoint, wherein the TCP handshake with the MP_JOIN option establishes a second MPTCP subflow of the MPTCP session, wherein exchanging the TCP handshake with the MP_JOIN option utilizes the maintained MPTCP session state information.

18. The apparatus of claim 17, wherein performing MPTCP communication with the remote endpoint further comprises, at the later time:

sending application data over the second MPTCP subflow while the second MPTCP subflow is in a pre-established state.

19. The apparatus of claim 17, wherein exchanging the TCP handshake with the MP_JOIN option with the remote endpoint comprises:

sending a SYN message with an MP_JOIN option from the electronic device to the remote endpoint;

receiving a SYN/ACK response with an MP_JOIN option from the remote endpoint at the electronic device;

sending an ACK response with an MP_JOIN option from the electronic device to the remote endpoint; and receiving an ACK response from the remote endpoint at the electronic device.

20. The apparatus of claim 19, wherein performing MPTCP communication with the remote endpoint further comprises:

sending application data over the second MPTCP subflow after sending the SYN message with the MP_JOIN option to the remote endpoint and before receiving the SYN/ACK response with the MP_JOIN option from the remote endpoint.

21. The apparatus of claim 19, wherein performing MPTCP communication with the remote endpoint further comprises:

sending application data over the second MPTCP subflow after sending the ACK response with the MP_JOIN option to the remote endpoint and before receiving the ACK response from the remote endpoint.

* * * * *